2 Sheets--Sheet 1.

E. H. STEARNS.

Improvement in Head-Blocks for Saw-Mills.

No. 4,979. Reissued July 16, 1872.

WITNESSES.

R. C. Wrenshall
E. C. Fitler

INVENTOR:

Edward H. Stearns,
by Bakewell, Christy & Kerr,
his Attys.

AM. PHOTO-LITHOGRAPHIC CO. N.Y. (OSBORNE'S PROCESS.)

2 Sheets--Sheet 2.
E. H. STEARNS.
Improvement in Head-Blocks for Saw-Mills.
No. 4,979. Reissued July 16, 1872.
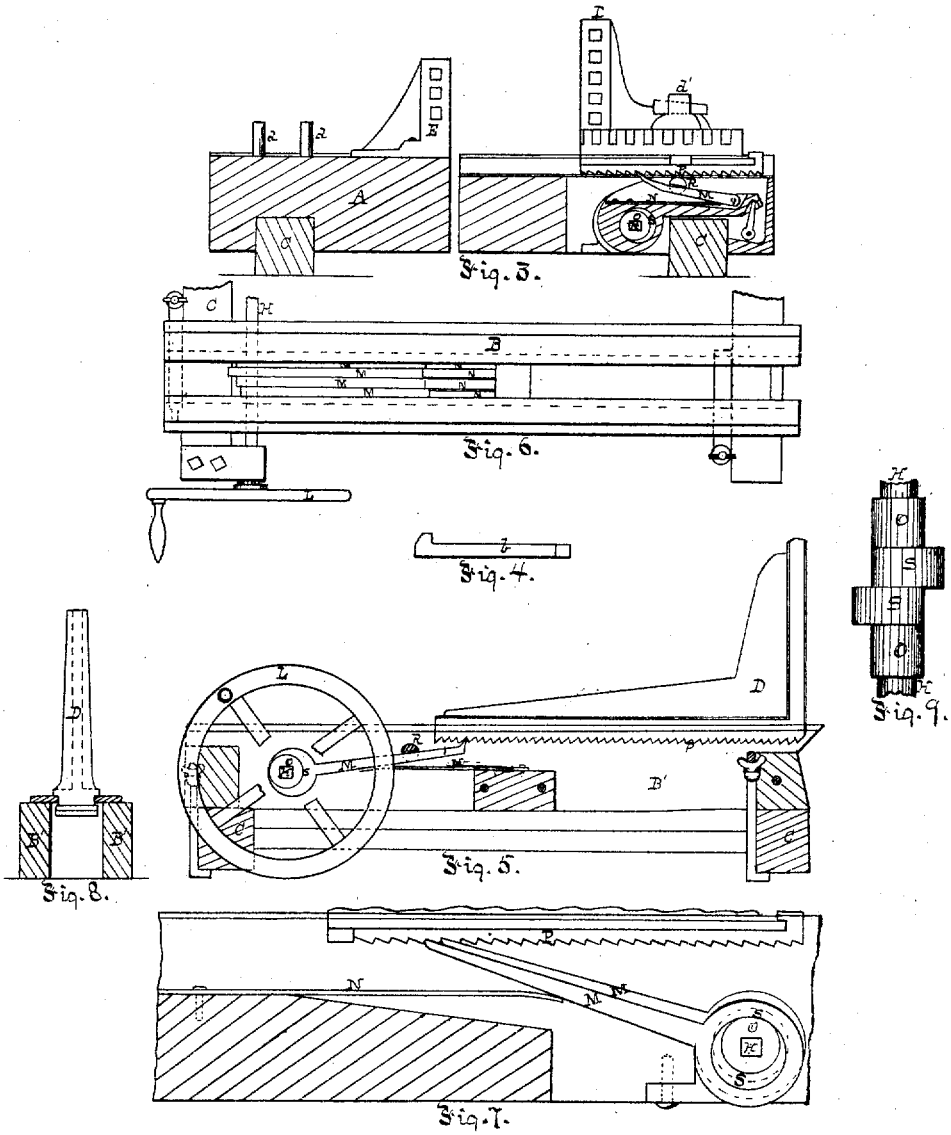
WITNESSES.
R. Q. Wenshall
E. C. Fitler
INVENTOR.
Edward H. Stearns,
by Bakewell, Christy & Kirr, his Att'ys.
A.M. PHOTO-LITHOGRAPHIC CO. N.Y. (OSBORNE'S PROCESS.)

UNITED STATES PATENT OFFICE.

EDWARD H. STEARNS, OF ERIE, PENNSYLVANIA.

IMPROVEMENT IN HEAD-BLOCKS FOR SAW-MILLS.

Specification forming part of Letters Patent No. 14,700, dated April 15, 1856; extended seven years; reissue No. 4,551, dated September 12, 1871; reissue No. 4,979, dated July 16, 1872.

SPECIFICATION.

*To all whom it may concern:*

Be it known that I, EDWARD H. STEARNS, of Erie, in the county of Erie, and State of Pennsylvania, have invented a new and useful Improvement in Head-Blocks for Saw-Mills; and I do hereby declare the following to be a full, clear, and exact description thereof, reference being had to the accompanying drawing, in two sheets, making a part of this specification, in which—

Figure 1:
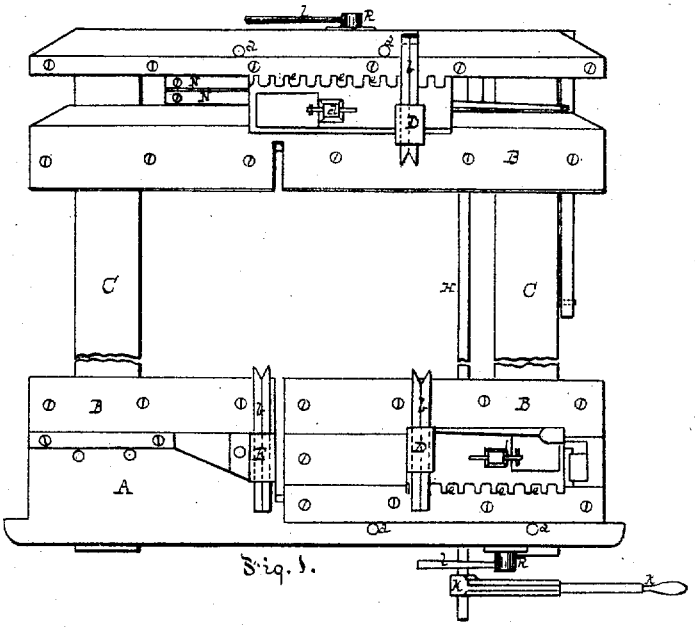
Figure 2:
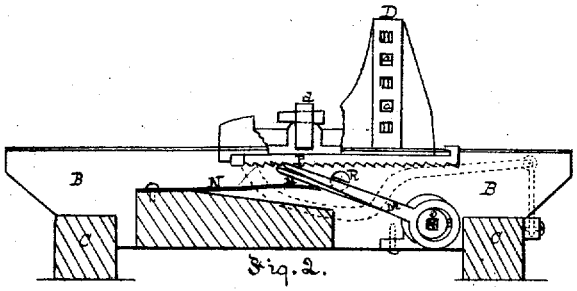

Figure 1, sheet 1, shows a plan view of the ends of a saw-carriage, with the head-blocks thereon, (sometimes called the head and foot blocks,) and with my improvements added thereto. Fig. 2, sheet 1, is a vertical longitudinal section of one of the head-blocks furnished with my improvement. Fig. 3, sheet 2, is a like view of the other head-blocks and showing a jointed instead of a straight pawl. Fig. 4, sheet 2, is a side view of one of my self-tightening dogs. Fig. 5, sheet 2, shows a vertical longitudinal section of the head-block as used on carriages of circular saws, and with a crank-wheel for operating the feeding-shaft. Fig. 6, sheet 2, is a plan view of the head-block of Fig. 5, but without the sliding knee, but showing four eccentrics, pawls, and springs, instead of two. Fig. 7, sheet 2, is an enlarged sectional view of a head-block, with a part of the sliding knee broken away. Fig. 8, sheet 2, shows an end elevation of a sliding knee or standard, and of the head-block; and Fig. 9, sheet 2, is a plan view of a pair of eccentrics, their bearings, and shaft.

Like letters of reference indicate like parts in each.

The feeding devices previously in use in saw-mills for feeding the log forward at successive intervals into the path of the saw, commonly gave to the log a motion uniform or nearly so in rapidity from the beginning to the end of the feeding-throw. The log thereby acquired some momentum which was liable to carry it a greater or less distance too far. Also the torsion of the feeding-shaft, where such a shaft was employed, was such as to interfere seriously with accuracy of feed; also such devices commonly secured only an intermittent feed—that is, a feed only at every alternate movement of the feeding-lever—and hence the feed was comparatively slow. Other imperfections existed in such machinery which need not here be specified.

The object of my invention is to improve the construction and combination of such and other operative devices in connection with saw-mill head-blocks, whereby the logs are moved laterally toward or into the path of the saw any desired distance with rapidity, accuracy, and ease; and when one log has been sawed up, the devices that caused the forward or feeding movement of the sliding knees or standards may be readily thrown out of gear, and leave the knees free to be moved back preparatory to receiving another log; and the invention consists in the features of construction and combination with reference to the ends in view, substantially as hereinafter set forth and claimed.

To enable others skilled in the art to make and use my invention, I will proceed to describe its construction and mode of operation.

A B and B′ are the supporting parts of the head-blocks as used in their different positions. C C are the longitudinal sides of the carriage; and D is the standard or knee which slides forward and back on the head-block. E is an upright, used on head-blocks with sash or muley saws for containing a holding-dog. A horizontal shaft, H, passes transversely through each head-block singly and is journaled therein, so as freely to revolve or oscillate, as may be preferred, or it may extend through and be connected with a head-block at the tail or opposite end of the carriage, or with any number of head-blocks on the same carriage. An oscillatory (or an oscillatory rotary) motion is imparted to it by means of a vibrating hand-lever, K, or a crank-wheel, L, may be used if the rotation of the shaft H be preferred. On the shaft H, immediately under the path of each sliding knee or standard D, I arrange a pair of eccentrics, S S, and by means of the well-known form of eccentric yoke, connect therewith a pair of pawls, M M, the forward ends of which take into the teeth of the ratchet-rack P, which is arranged on each sliding knee or standard D. The eccentrics are so arranged or set with reference to each other that as one imparts a forward motion to one pawl, the other will cause the other pawl to come back for a new bite, and so on alternately and continuously, both pawls reciprocating simultaneously but in opposite directions, and each pawl, as it advances, takes into the teeth of the rack P, forces the knee D forward, and slides the log over into the path of the saw. In this way the log is fed over at every movement of the lever K. For convenience in construction and use, I cast the eccentrics S S, and the bearings O O, in one casting, and mount the same in proper place on the shaft H. The motion desired for operating the eccentrics may be either oscillatory or rotary, and in the former case I prefer to make use of a vibratory or oscillatory lever, K, attached to the shaft H, and in the latter case a crank-wheel, L, may be employed. The peripheries of the eccentrics may be made broad, to increase their wearing surfaces, thereby increasing their durability. In Fig. 7 I have shown the full side of each eccentric at right angles or nearly so to the pawls. It will be readily seen that, as either eccentric moves forward so as to impart a forward thrust to its pawl, and thereby cause the sliding knee or standard to advance, the forward motion thus produced will at first be comparatively rapid, but will gradually become slower as it approaches what is commonly known as the dead-point. Hence, as the log moves less slowly the nearer it comes to the position desired it will gradually lose its momentum and not be in danger of going further than the limit of the throw caused directly by the eccentric and pawl. This motion—viz., that produced by an eccentric (which is similar, in this respect, to a crank, and produces a like result)—is such as to insure the utmost accuracy in feeding; and this element of utility is secured whether one, two, or more eccentrics and pawls be used to each head-block, and also where the shaft H extends from one to another of two or more head-blocks, with one, two, or more eccentrics and pawls to each head-block.

A further advantage in the construction described is that the purchase of the shaft H upon the pawl increases as the motion given to the rack decreases, so that, as the eccentric approaches the dead-point, the torsion of the shaft correspondingly decreases. This fact more perfectly insures uniformity and accuracy of feed.

Where two pawls are used that which works below the dead-point is preferably made half a notch shorter or longer than the other in order to divide the notches so that there may be a dead-point stopping-place at every half notch as well as at every whole one on the rack. The length of the notches on the rack may vary so as best to adapt the feed to the various thicknesses of lumber to be sawed; and the throw of the eccentrics may be such as to move the rack a quarter of an inch, or any other desired distance, at each oscillatory movement of the shaft; also, their distance apart in the circle may be varied so as give the best and most convenient sweep to the setting-lever.

In Fig. 3 I have shown the pawls jointed. Their operation is the same as that already described, and will be readily understood by those skilled in the art.

To hold the pawls in gear with the rack I make use of springs N N, one to each pawl, which springs are secured at one end to the head-block, and at the other end bear each against its pawl, so as to press it up to its work. In order, now, to throw the pawls out of gear with the ratchet so that the sliding knees can be run back, preparatory to receiving a new log, I introduce a cam-shaft, R, which passes transversely through the head-block in line with the pawls when the latter are in gear with the ratchet. That part of it which comes opposite the pawls is cut away to the depth of about one-half of its diameter, more or less, and is so placed in the blocks that the flat or cut-away part shall be next the pawls when the latter are acting on the rack; and also so that by revolving it till the round or cam side comes against the pawls the latter will be forced out of gear with the rack; and then the knee or standard is free to be moved back to the proper position for receiving another log. This latter may be done by means of a lever inserted in the notches *e* of the knee, and bearing against pins *d* fixed in the head-block as fulcrums. The shaft R receives an oscillatory (or oscillatory-rotary) motion from a hand-lever, *l*, so that, whichever way it may be oscillated, it will force the pawls out of gear with the rack.

The dogs *b b* are made with their inner or holding ends beveled chiefly on one side, like a chisel, and are arranged two by two, with their bevels facing each other, in holes *a* in the uprights D and E. Then, on being driven into the end of the log, the inclination of the beveled ends forces their forward ends apart and clamps them tight in the standard or knee, while they take, at the same time, a secure bite on the log.

What I claim as my invention, and desire to secure by Letters Patent, is—

1. In combination with the sliding knee D of a saw-mill head-block, a ratchet-rack, P, and reciprocating pawls M, alternately acting in advancing the knee, in the manner and by the means substantially as set forth.

2. The combination of eccentrics S on oscillating shaft H with pawls M, springs N, and rack P, substantially as described.

3. The eccentrics S S, when arranged upon the oscillating shaft H and operating a corresponding number of pawls of a head-block, substantially as and for the purposes described.

4. The wheel L and shaft H of a saw-mill carriage, in combination with one, two, or more eccentrics, S, arranged and operative substantially in the manner and for the purposes described.

5. The cam-shaft R for throwing the pawls M out of contact with the notches in rack P, constructed to operate substantially as described.

6. The double dog *b*, in combination with the mortise *a* of standards D E, constructed to operate substantially as described.

In witness whereof I, the said EDWARD H. STEARNS, have hereunto set my hand.

EDWARD H. STEARNS.

Witnesses:

A. S. NICHOLSON,

JAMES J. KAY.